United States Patent
Baladhandapani et al.

(10) Patent No.: US 12,008,289 B2
(45) Date of Patent: Jun. 11, 2024

(54) METHODS AND SYSTEMS FOR TRANSCRIPTION PLAYBACK WITH VARIABLE EMPHASIS

(71) Applicant: HONEYWELL INTERNATIONAL INC., Charlotte, NC (US)

(72) Inventors: Gobinathan Baladhandapani, Madurai (IN); Hariharan Saptharishi, Madurai (IN); Mahesh Kumar Sampath, Madurai (IN); Sivakumar Kanagarajan, Bangalore (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 265 days.

(21) Appl. No.: 17/459,605

(22) Filed: Aug. 27, 2021

(65) Prior Publication Data

US 2023/0011078 A1    Jan. 12, 2023

(30) Foreign Application Priority Data

Jul. 7, 2021    (IN) .............................. 202111030465

(51) Int. Cl.
G06F 17/00    (2019.01)
G06F 3/16    (2006.01)
G10L 15/26    (2006.01)

(52) U.S. Cl.
CPC .............. G06F 3/165 (2013.01); G10L 15/26 (2013.01)

(58) Field of Classification Search
CPC ................................ G06F 3/165; G10L 25/26
USPC ........................................................ 704/235
See application file for complete search history.

(56) References Cited

U.S. PATENT DOCUMENTS

| | | | |
|---|---|---|---|
| 6,446,040 B1 | 9/2002 | Socher et al. |
| 7,299,182 B2 | 11/2007 | Xie |
| 8,949,128 B2 | 2/2015 | Meyer et al. |
| 9,640,173 B2 | 5/2017 | Pulz et al. |
| 2005/0177369 A1 | 8/2005 | Stoimenov et al. |

(Continued)

FOREIGN PATENT DOCUMENTS

| | | |
|---|---|---|
| CN | 111768755 A | 10/2020 |
| EP | 2552109 B1 | 12/2017 |

OTHER PUBLICATIONS

Lee, Younggun, et al., "Voice Imitating Text-to-Speech Neural Networks," arXiv:1806.00927v1 [cs.SD] Jun. 4, 2018.

(Continued)

Primary Examiner — Paul C McCord
(74) Attorney, Agent, or Firm — Lorenz & Kopf LLP

(57) ABSTRACT

Methods and systems are provided for assisting operation of a vehicle using speech recognition and transcription using text-to-speech for transcription playback with variable emphasis. One method involves analyzing a transcription of an audio communication with respect to the vehicle to identify an operational term pertaining to a current operational context of the vehicle within the transcription, creating an indicator identifying the operational term within the transcription for emphasis when the operational term pertains to the current operational context of the vehicle, identifying a user-configured playback rate; and generating an audio reproduction of the transcription of the audio communication in accordance with the user-configured playback rate, wherein the operational term is selectively emphasized within the audio reproduction based on the indicator.

19 Claims, 6 Drawing Sheets

(56) References Cited

U.S. PATENT DOCUMENTS

| | | |
|---|---|---|
| 2009/0112582 A1 | 4/2009 | Kuwagaki et al. |
| 2010/0057465 A1 | 3/2010 | Kirsch et al. |
| 2011/0288861 A1 | 11/2011 | Kurzweil et al. |
| 2014/0365217 A1 | 12/2014 | Fume et al. |
| 2016/0267901 A1 | 9/2016 | Zhao et al. |
| 2017/0125008 A1* | 5/2017 | Maisonnier ............ G10L 15/22 |
| 2017/0287467 A1 | 10/2017 | Lafon et al. |
| 2018/0182373 A1 | 6/2018 | Almudafar-Depeyrot et al. |
| 2018/0217717 A1* | 8/2018 | Yasuda ................. G06F 3/0488 |
| 2020/0302786 A1* | 9/2020 | Kano .................... G10L 13/033 |
| 2022/0208174 A1* | 6/2022 | Bromand ............... G10L 15/08 |

OTHER PUBLICATIONS

U.S. Appl. No. 16/879,383, filed May 20, 2020, and entitled, "System and Method for Assisting Pilot Through Clearance Playback."

* cited by examiner

METHODS AND SYSTEMS FOR TRANSCRIPTION PLAYBACK WITH VARIABLE EMPHASIS

CROSS REFERENCE TO RELATED APPLICATION

The present application claims benefit of prior filed India Provisional Patent Application No. 202111030465, filed Jul. 7, 2021, which is hereby incorporated by reference herein in its entirety.

TECHNICAL FIELD

The subject matter described herein relates generally to vehicle systems, and more particularly, embodiments of the subject matter relate to avionics systems and methods for improving comprehension of air traffic control clearance communications.

BACKGROUND

Air traffic control typically involves voice communications between air traffic control and a pilot or crewmember onboard the various aircrafts within a controlled airspace. For example, an air traffic controller (ATC) may communicate an instruction or a request for pilot action by a particular aircraft using a call sign assigned to that aircraft. A pilot or crewmember onboard that aircraft subsequently acknowledges the request (e.g., by reading back the received information) in a separate communication that also includes the call sign. As a result, the ATC can determine that the correct aircraft has acknowledged the request, that the request was correctly understood, what the pilot intends to do, etc.

Unfortunately, there are numerous factors that can complicate clearance communications, or otherwise result in a misinterpretation of a clearance communication, such as, for example, the volume of traffic in the airspace, similarities between call signs of different aircrafts in the airspace, congestion or interference on the communications channel being utilized, and/or human fallibilities (e.g., inexperience, hearing difficulties, memory lapse, language barriers, distractions, fatigue, etc.). For example, at busy airports with a high volume of traffic, the ATC may issue clearance communications with a faster pace, which may reduce the pilot's ability to understand, jot down or otherwise comprehend a clearance communication in its entirety. As a result, an incomplete and/or incorrect clearance communication could be acknowledged or acted on by a pilot, or a pilot of one aircraft attempts to adhere to a clearance intended for another aircraft (e.g., as a result of call sign confusion). Accordingly, it is desirable to provide aircraft systems and methods that facilitate adherence to ATC clearances or commands with improved accuracy. Other desirable features and characteristics of the methods and systems will become apparent from the subsequent detailed description and the appended claims, taken in conjunction with the accompanying drawings and the preceding background.

BRIEF SUMMARY

Methods and systems are provided for assisting operation of a vehicle, such as an aircraft, using speech recognition and transcription by selectively emphasizing an operational term pertaining to a current operational context of the vehicle within an audio reproduction during playback of a transcription. One method involves analyzing a transcription of an audio communication with respect to the vehicle to identify an operational term pertaining to a current operational context of the vehicle within the transcription, creating an indicator identifying the operational term within the transcription for emphasis when the operational term pertains to the current operational context of the vehicle, identifying a user-configured playback rate, and generating an audio reproduction of the transcription of the audio communication in accordance with the user-configured playback rate, wherein the operational term is selectively emphasized within the audio reproduction based on the indicator.

In another embodiment, a computer-readable medium having computer-executable instructions stored thereon is provided. The computer-executable instructions, when executed by a processing system, cause the processing system to analyze a transcription of an audio communication to identify an operational term pertaining to a current operational context of a vehicle within the transcription, create an indicator identifying the operational term within the transcription for emphasis when the operational term pertains to the current operational context of the vehicle, identify a user-configured playback rate, and generate an audio reproduction of the transcription of the audio communication in accordance with the user-configured playback rate, wherein the operational term is selectively emphasized within the audio reproduction based on the indicator.

In another embodiment, a system is provided that includes a data storage element to maintain a transcription of an audio communication, a user interface to receive indication of a user-configured playback rate and a processing system coupled to the user interface and the data storage element. The processing system is configured to receive indicia of a current operational context of a vehicle from one or more systems onboard the vehicle, analyze the transcription of the audio communication to identify, within the transcription, an operational term pertaining to the current operational context, create an indicator identifying the operational term within the transcription for emphasis when the operational term pertains to the current operational context of the vehicle, and in response to selection of the transcription for playback, generate an audio output corresponding to the transcription of the audio communication in accordance with the user-configured playback rate, wherein the operational term is selectively emphasized within the audio output based on the indicator.

This summary is provided to describe select concepts in a simplified form that are further described in the detailed description. This summary is not intended to identify key or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
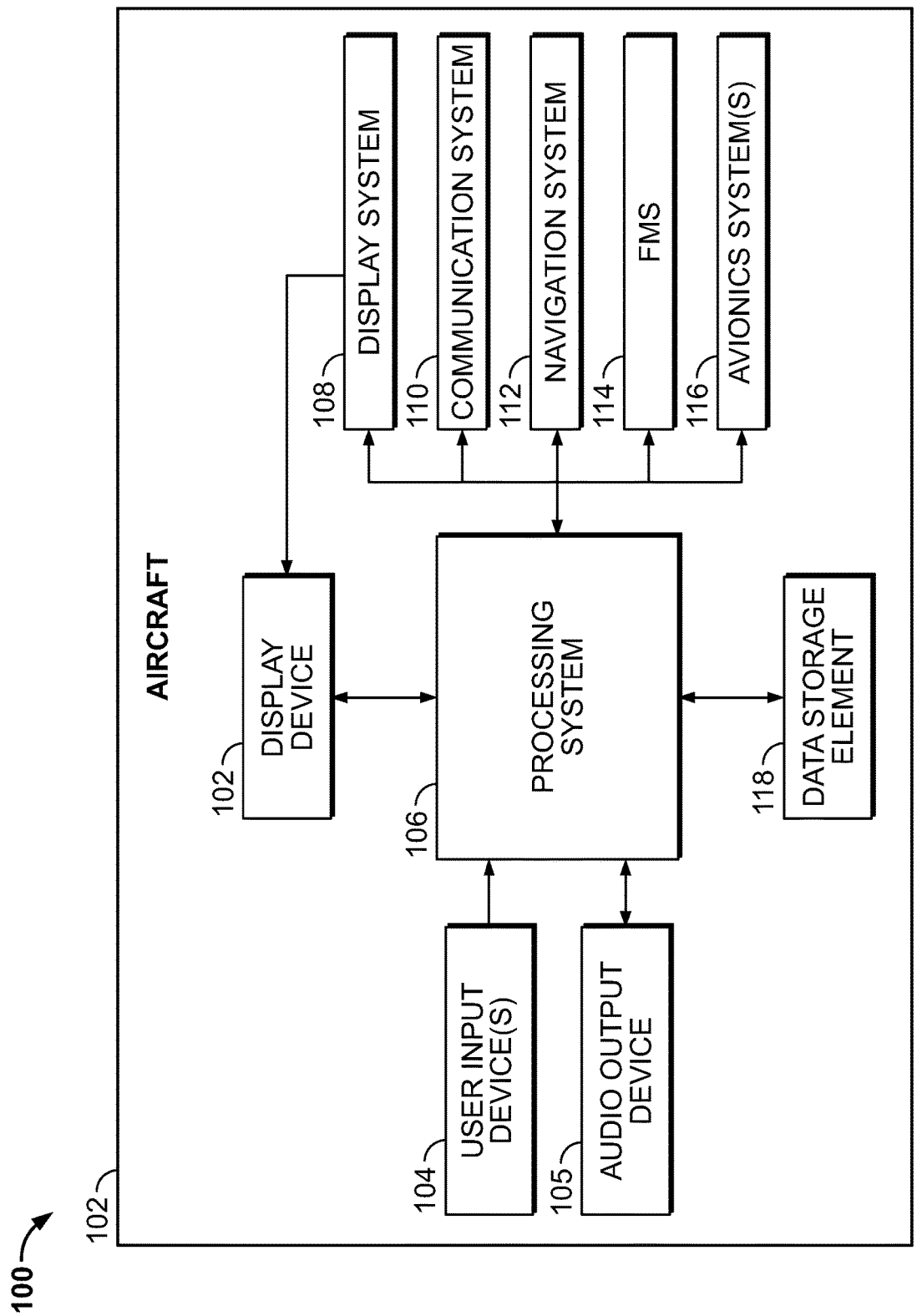
FIG. 1 is a block diagram illustrating a system suitable for use with a vehicle such as an aircraft in accordance with one or more exemplary embodiments.

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein generally relate to systems and methods for improving comprehension of clearance communications associated with different vehicles operating within a commonly controlled area by enabling playback of transcriptions of clearance communications using a word per minute (WPM) or playback rate that is configurable to improve listening comprehension, along with selective emphasis of any operational terms within a respective transcription that are relevant or otherwise pertain to the current operational context of the vehicle. For example, a pilot or other user operating the vehicle may manually configure or otherwise adjust the playback rate to utilize a user-configured WPM setting that the user perceives as maximizing or optimizing his or her listening comprehension. In this regard, the transcription playback may vary across different users or vehicle operators in a user-specific manner to improve listening comprehension in a user-specific manner.

Additionally, operational terms within the transcription that are relevant to the current vehicle operation may be tagged or otherwise indicated, such that the more operationally-significant terms are played back with increased emphasis relative to remaining words or terms within the transcription. For example, an assigned operational parameter value contained within a transcription may be played back with a slower WPM or playback rate and/or an increased volume relative to the remainder of the playback of the transcription to provide aural emphasis on the operational parameter value. By selectively and dynamically emphasizing operational terms in a context-sensitive manner, the comprehension of the operational terms within the transcription is further improved, thereby reducing the likelihood of confusion or miscommunication with respect to any operational terms of significance to the current operational context of the vehicle. For purposes of explanation, the subject matter is primarily described herein in the context of aircraft operating in a controlled airspace; however, the subject matter described herein is not necessarily limited to aircraft or avionic environments, and in alternative embodiments, may be implemented in an equivalent manner for ground operations, marine operations, or otherwise in the context of other types of vehicles and travel spaces.

As described in greater detail below in the context of FIGS. 2-4, audio communications received at an aircraft are transcribed before analyzing the transcription of an audio communication to identify one or more operational terms pertaining to a current operational context of the aircraft within the transcription. For example, based on various contextual factors such as the current location of the aircraft with respect to a taxi clearance, a flight plan, or other defined route or manner of operation of the aircraft, the current flight phase, the current geographic location of the aircraft, the current altitude of the aircraft, the current physical configuration of the aircraft, and/or the like, the transcription of the audio communication may be parsed and analyzed to identify any operational subject(s) or operational parameter(s) that are likely to be relevant to the current operational context. In this regard, natural language processing or similar artificial intelligence (AI) techniques may be applied to a transcription of an audio communication to ascertain the intent of the respective audio communication and identify the operational subjects or entities to which the respective audio communication pertains, such as, a particular aircraft or flight identifier, a runway, a taxiway, a waypoint, a heading, an altitude, a flight level, a communications radio or another avionics system or setting, an aircraft action (e.g., landing, takeoff, pushback, hold, or the like) and/or the like. Thereafter, the operational objective may be utilized to identify assigned values for various operational parameters within the transcription using syntactic analysis and applicable phraseology standards (e.g., the international standards of phraseology set forth in the International Civil Aviation Organization (ICAO) Annex 10 Volume II Chapter 5, ICAO Doc 4444 Chapter 12 and in ICAO Doc 9432—Manual of Radiotelephony).

When operational terms relevant to the current operational context for the aircraft are identified within a transcription, one or more tags or indicators are created in association with the transcription that identify the operational terms within the transcription that should be emphasized given the current operational context of the aircraft at the time the respective audio communication was received. For example, a database entry that maintains the transcribed text for an audio communication may be updated to include one or more fields or columns of metadata that tag the database entry as including one or more operational term(s) for emphasis and identifying the position of those terms within the transcribed text. Thereafter, when generating an audio reproduction of the transcription, a text-to-speech system may utilize the emphasis tag(s) associated with the transcription to identify the operational terms to be emphasized within the transcribed text and selectively emphasize those terms, for example, by playing back those terms with a slower WPM and/or an increased volume relative to the other terms of the transcription. Thus, comprehension of the operationally-significant terms is improved by adding emphasis in concert with tailoring playback rate to suit the needs or desires of an individual user, thereby reducing miscommunication and increasing safety while also reducing communications congestion by reducing requests to repeat or clarify preceding communications.

In addition to user-configurability of the playback rate, in some embodiments, the playback rate may dynamically vary in a context sensitive manner. For example, based on the currant flight phase and/or the duration of the flight, the user-configured playback rate may be dynamically adjusted to a progressively slower playback rate to account for fatigue, increased stress associated with particular flight phases (e.g., approach), and/or the like. In this regard, machine learning or other AI techniques may be utilized to analyze historical playback behavioral data (either on a user-specific or population-wide basis) with respect to various contextual factors to identify scenarios where more playback requests (or multiple playback requests) are more likely based on correlations between playback requests and those contextual factors. Thereafter, when the current operational context corresponds to a combination of contextual factors where playback requests are more likely or historical playback behavior indicates listening comprehension is more likely to be reduced or impaired, the text-to-speech system may dynamically adjust the user-configured playback rate in a context-sensitive manner to further improve comprehension.

FIG. 1 depicts an exemplary embodiment of a system 100 which may be utilized with a vehicle, such as an aircraft 120. In an exemplary embodiment, the system 100 includes, without limitation, a display device 102, one or more user input devices 104, one or more audio output device(s) 105 a processing system 106, a display system 108, a communications system 110, a navigation system 112, a flight management system (FMS) 114, one or more avionics systems 116, and a data storage element 118 suitably configured to support operation of the system 100, as described in greater detail below.

In exemplary embodiments, the display device 102 is realized as an electronic display capable of graphically displaying flight information or other data associated with operation of the aircraft 120 under control of the display system 108 and/or processing system 106. In this regard, the display device 102 is coupled to the display system 108 and the processing system 106, and the processing system 106 and the display system 108 are cooperatively configured to display, render, or otherwise convey one or more graphical representations or images associated with operation of the aircraft 120 on the display device 102.

The user input device 104 is coupled to the processing system 106, and the user input device 104 and the processing system 106 are cooperatively configured to allow a user (e.g., a pilot, co-pilot, or crew member) to interact with the display device 102 and/or other elements of the system 100, as described in greater detail below. Depending on the embodiment, the user input device(s) 104 may be realized as a keypad, touchpad, keyboard, mouse, touch panel (or touchscreen), joystick, knob, line select key or another suitable device adapted to receive input from a user. In some exemplary embodiments, the user input device 104 includes or is realized as an audio input device, such as a microphone, audio transducer, audio sensor, or the like, that is adapted to allow a user to provide audio input to the system 100 in a "hands free" manner using speech recognition. It should be appreciated that in practice, the aircraft 120 will likely include numerous different types of user input devices 104 onboard in the cockpit of the aircraft 120, and the number and type of user input devices may vary depending on the make of the aircraft 120, the model of the aircraft 120, the operator of the aircraft 120, and potentially other factors. Accordingly, the subject matter described herein is not limited to any particular type, number, or configuration of user input devices 104. Moreover, in various embodiments, one or more user input devices 104 may be communicatively coupled to one or more other systems 108, 110, 112, 114, 116 onboard the aircraft 120, either in parallel with or independently of the processing system 106, and in some embodiments, the processing system 106 may receive user inputs indirectly via one or more other systems 108, 110, 112, 114, 116 onboard the aircraft 120.

The audio output device 105 is coupled to the processing system 106, and the audio output device 105 and the processing system 106 are cooperatively configured to provide auditory feedback to a user, as described in greater detail below. Depending on the embodiment, the audio output device 105 may be realized as a speaker, headphone, earphone, earbud, or another suitable device adapted to provide auditory output to a user. In this regard, in some embodiments, a user input device 104 and an audio output device 105 may be integrated on a single headset, as will be appreciated in the art. Again, it should be appreciated that in practice, the aircraft 120 may include numerous different types of audio output devices 105 onboard in the cockpit of the aircraft 120, and the number and type of audio output devices may vary depending on the make, the model, and/or the operator of the aircraft 120, and potentially other factors, and as such, the subject matter described herein is not limited to any particular type, number, or configuration of audio output devices 105. Moreover, in various embodiments, one or more audio output devices 105 may be communicatively coupled to one or more other systems 108, 110, 112, 114, 116 onboard the aircraft 120, either in parallel with or independently of the processing system 106, and in some embodiments, the processing system 106 may provide outputs to such audio output devices 105 indirectly via one or more other systems 108, 110, 112, 114, 116 onboard the aircraft 120.

The processing system 106 generally represents the hardware, software, and/or firmware components configured to facilitate communications and/or interaction between the elements of the system 100 and perform additional tasks and/or functions to support operation of the system 100, as described in greater detail below. Depending on the embodiment, the processing system 106 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 106 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 106 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 106, or in any practical combination thereof. For example, in one or more embodiments, the processing system 106 includes or otherwise accesses a data storage element (or memory), which may be realized as any sort of non-transitory short or long term storage media capable of storing programming instructions for execution by the processing system 106. The code or other computer-executable programming instructions, when read and executed by the processing system 106, cause the processing system 106 to support or otherwise perform certain tasks, operations, functions, and/or processes described herein.

In some embodiments, the processing system 106 implements a speech recognition engine (or voice recognition engine) and/or speech-to-text system adapted to receive audio input from a user. In such embodiments, the processing system 106 may also include various filters, analog-to-digital converters (ADCs), digital-to-analog converters (DACs), speech synthesizers, and the like, which are suitably configured to support operations of the aircraft system 100 (e.g., receiving auditory input from the user input device 104 or providing auditory feedback via the audio output device 105). Additionally, the processing system 106 may also implement or support a speech generation engine and/or text-to-speech system adapted to generate audio output based on text or other data received from another system 108, 110, 112, 114, 116 onboard the aircraft 120.

The display system 108 generally represents the hardware, software, and/or firmware components configured to control the display and/or rendering of one or more navigational maps and/or other displays pertaining to operation of the aircraft 120 and/or onboard systems 110, 112, 114, 116 on the display device 102. In this regard, the display system 108 may access or include one or more databases suitably configured to support operations of the display system 108, such as, for example, a terrain database, an obstacle database, a navigational database, a geopolitical database, a terminal airspace database, a special use airspace database, or other information for rendering and/or displaying navigational maps and/or other content on the display device 102.

In the illustrated embodiment, the aircraft system 100 includes a data storage element 118, which contains aircraft procedure information (or instrument procedure information) for a plurality of airports and maintains association between the aircraft procedure information and the corresponding airports. Depending on the embodiment, the data storage element 118 may be physically realized using RAM memory, ROM memory, flash memory, registers, a hard disk, or another suitable data storage medium known in the art or any suitable combination thereof. As used herein, aircraft procedure information should be understood as a set of operating parameters, constraints, or instructions associated with a particular aircraft action (e.g., approach, departure, arrival, climbing, and the like) that may be undertaken by the aircraft 120 at or in the vicinity of a particular airport. An airport should be understood as referring to any sort of location suitable for landing (or arrival) and/or takeoff (or departure) of an aircraft, such as, for example, airports, runways, landing strips, and other suitable landing and/or departure locations, and an aircraft action should be understood as referring to an approach (or landing), an arrival, a departure (or takeoff), an ascent, taxiing, or another aircraft action having associated aircraft procedure information. An airport may have one or more predefined aircraft procedures associated therewith, wherein the aircraft procedure information for each aircraft procedure at each respective airport are maintained by the data storage element 118 in association with one another.

Depending on the embodiment, the aircraft procedure information may be provided by or otherwise obtained from a governmental or regulatory organization, such as, for example, the Federal Aviation Administration in the United States. In an exemplary embodiment, the aircraft procedure information comprises instrument procedure information, such as instrument approach procedures, standard terminal arrival routes, instrument departure procedures, standard instrument departure routes, obstacle departure procedures, or the like, traditionally displayed on a published charts, such as Instrument Approach Procedure (IAP) charts, Standard Terminal Arrival (STAR) charts or Terminal Arrival Area (TAA) charts, Standard Instrument Departure (SID) routes, Departure Procedures (DP), terminal procedures, approach plates, and the like. In exemplary embodiments, the data storage element 118 maintains associations between prescribed operating parameters, constraints, and the like and respective navigational reference points (e.g., waypoints, positional fixes, radio ground stations (VORs, VOR-TACs, TACANs, and the like), distance measuring equipment, non-directional beacons, or the like) defining the aircraft procedure, such as, for example, altitude minima or maxima, minimum and/or maximum speed constraints, RTA constraints, and the like. In this regard, although the subject matter may be described in the context of a particular procedure for purpose of explanation, the subject matter is not intended to be limited to use with any particular type of aircraft procedure and may be implemented for other aircraft procedures in an equivalent manner.

Still referring to FIG. 1, in exemplary embodiments, the processing system 106 is coupled to the navigation system 112, which is configured to provide real-time navigational data and/or information regarding operation of the aircraft 120. The navigation system 112 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 112, as will be appreciated in the art. The navigation system 112 is capable of obtaining and/or determining the instantaneous position of the aircraft 120, that is, the current (or instantaneous) location of the aircraft 120 (e.g., the current latitude and longitude) and the current (or instantaneous) altitude or above ground level for the aircraft 120. The navigation system 112 is also capable of obtaining or otherwise determining the heading of the aircraft 120 (i.e., the direction the aircraft is traveling in relative to some reference). In the illustrated embodiment, the processing system 106 is also coupled to the communications system 110, which is configured to support communications to and/or from the aircraft 120. For example, the communications system 110 may support communications between the aircraft 120 and air traffic control or another suitable command center or ground location. In this regard, the communications system 110 may be realized using a radio communication system and/or another suitable data link system.

In exemplary embodiments, the processing system 106 is also coupled to the FMS 114, which is coupled to the navigation system 112, the communications system 110, and one or more additional avionics systems 116 to support navigation, flight planning, and other aircraft control functions in a conventional manner, as well as to provide real-time data and/or information regarding the operational status of the aircraft 120 to the processing system 106. Although FIG. 1 depicts a single avionics system 116, in practice, the system 100 and/or aircraft 120 will likely include numerous avionics systems for obtaining and/or providing real-time flight-related information that may be displayed on the display device 102 or otherwise provided to a user (e.g., a pilot, a co-pilot, or crew member). For example, practical embodiments of the system 100 and/or aircraft 120 will likely include one or more of the following avionics systems suitably configured to support operation of the aircraft 120: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

It should be understood that FIG. 1 is a simplified representation of the system 100 for purposes of explanation and ease of description, and FIG. 1 is not intended to limit the application or scope of the subject matter described herein in any way. It should be appreciated that although FIG. 1 shows the display device 102, the user input device 104, the audio output device 105, and the processing system 106 as being located onboard the aircraft 120 (e.g., in the cockpit), in practice, one or more of the display device 102, the user input device 104, the audio output device 105 and/or the processing system 106 may be located outside the aircraft 120 (e.g., on the ground as part of an air traffic control center or another command center) and communicatively coupled to the remaining elements of the system 100 (e.g., via a data link and/or communications system 110). Similarly, in some embodiments, the data storage element 118 may be located outside the aircraft 120 and communicatively coupled to the processing system 106 via a data link and/or communications system 110. Furthermore, practical embodiments of the system 100 and/or aircraft 120 will include numerous other devices and components for providing additional functions and features, as will be appreciated in the art. In this regard, it will be appreciated that although FIG. 1 shows a single display device 102, in practice, additional display devices may be present onboard the aircraft 120. Additionally, it should be noted that in other embodiments, features and/or functionality of processing system 106 described herein can be implemented by or otherwise integrated with the features and/or functionality provided by the FMS 114. In other words, some embodiments may integrate the processing system 106 with the FMS 114. In yet other embodiments, various aspects of the subject matter described herein may be implemented by or at an electronic flight bag (EFB) or similar electronic device that is communicatively coupled to the processing system 106 and/or the FMS 114.

Figure 2:
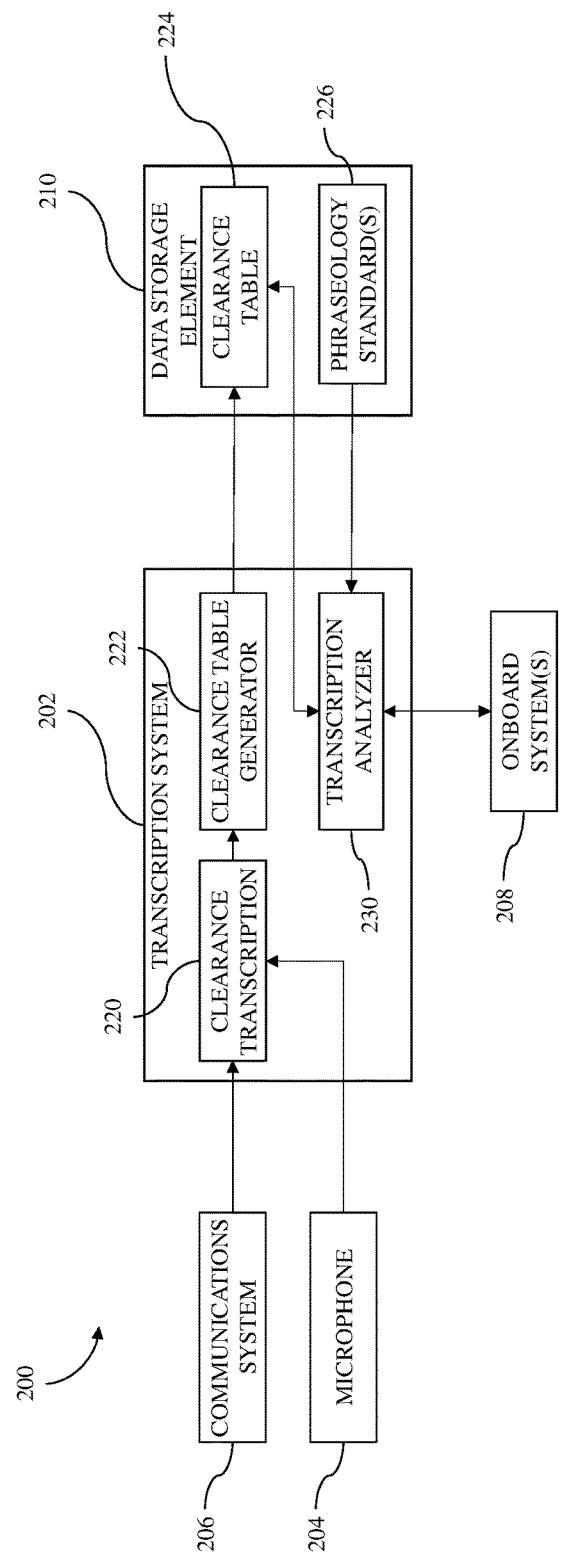
FIG. 2 is a block diagram illustrating a speech recognition system suitable for use with the aircraft system of FIG. 1 in accordance with one or more exemplary embodiments.

FIG. 2 depicts an exemplary embodiment of a speech recognition system 200 for transcribing speech, voice commands or any other received audio communications (e.g., broadcasts received from the automatic terminal information service (ATIS)). In one or more exemplary embodiments, the speech recognition system 200 is implemented or otherwise provided onboard a vehicle, such as aircraft 120; however, in alternative embodiments, the speech recognition system 200 may be implemented independent of any aircraft or vehicle, for example, at a ground location such as an air traffic control facility. That said, for purposes of explanation, the speech recognition system 200 may be primarily described herein in the context of an implementation onboard an aircraft. The illustrated speech recognition system 200 includes a transcription system 202, an audio input device 204 (or microphone) and one or more communications systems 206 (e.g., communications system 110). The transcription system 202 is also coupled to one or more onboard systems 208 (e.g., one or more avionics systems 108, 110, 112, 114, 116) to receive signals or data indicative of the current operational context (e.g., the current flight phase, the current airspace or geographic region of operation, the current aircraft configuration, the current aircraft altitude, and/or the like) and/or provide output signals or other indicia to a desired destination onboard system 208 (e.g., via an avionics bus or other communications medium). It should be understood that FIG. 2 is a simplified representation of the speech recognition system 200 for purposes of explanation and ease of description, and FIG. 2 is not intended to limit the application or scope of the subject matter described herein in any way.

The transcription system 202 generally represents the processing system or component of the speech recognition system 200 that is coupled to the microphone 204 and communications system(s) 206 to receive or otherwise obtain audio clearance communications and other audio communications, analyze the audio content of the clearance communications, and transcribe the audio content of the clearance communications, as described in greater detail below. Depending on the embodiment, the transcription system 202 may be implemented as a separate standalone hardware component, while in other embodiments, the features and/or functionality of the transcription system 202 may be integrated with and/or implemented using another processing system (e.g., processing system 106). In this regard, the transcription system 202 may be implemented using any sort of hardware, firmware, circuitry and/or logic components or combination thereof. For example, depending on the embodiment, the transcription system 202 may be realized as a general purpose processor, a content addressable memory, a digital signal processor, an application specific integrated circuit, a field programmable gate array, any suitable programmable logic device, discrete gate or transistor logic, processing core, a combination of computing devices (e.g., a plurality of processing cores, a combination of a digital signal processor and a microprocessor, a plurality of microprocessors, one or more microprocessors in conjunction with a digital signal processor core, or any other such configuration), discrete hardware components, or any combination thereof, designed to perform the functions described herein.

The audio input device 204 generally represents any sort of microphone, audio transducer, audio sensor, or the like capable of receiving voice or speech input. In this regard, in one or more embodiments, the audio input device 204 is realized as a microphone (e.g., user input device 104) onboard the aircraft 120 to receive voice or speech annunciated by a pilot or other crewmember onboard the aircraft 120 inside the cockpit of the aircraft 120. The communications system(s) 206 (e.g., communications system 110) generally represent the avionics systems capable of receiving clearance communications from other external sources, such as, for example, other aircraft, an air traffic controller, or the like. Depending on the embodiment, the communications system(s) 206 could include one or more of a very high frequency (VHF) radio communications system, a controller-pilot data link communications (CPDLC) system, an aeronautical operational control (AOC) communications system, an aircraft communications addressing and reporting system (ACARS), and/or the like.

In exemplary embodiments, computer-executable programming instructions are executed by the processor, control module, or other hardware associated with the transcription system 202 and cause the transcription system 202 to generate, execute, or otherwise implement a clearance transcription application 220 capable of analyzing, parsing, or otherwise processing voice, speech, or other audio input received by the transcription system 202 to convert the received audio content into a corresponding textual representation. In this regard, the clearance transcription application 220 may implement or otherwise support a speech recognition engine (or voice recognition engine) or other speech-to-text system. Accordingly, the transcription system 202 may also include various filters, analog-to-digital converters (ADCs), or the like, and the transcription system 202 may include or otherwise access a data storage element 210 (or memory) that stores a speech recognition vocabulary for use by the clearance transcription application 220 in converting audio inputs into transcribed textual representations. In one or more embodiments, the clearance transcription application 220 may also mark, tag, or otherwise associate a transcribed textual representation of a clearance communication with an identifier or other indicia of the source of the clearance communication (e.g., the onboard microphone 204, a radio communications system 206, or the like).

In exemplary embodiments, the computer-executable programming instructions executed by the transcription system 202 also cause the transcription system 202 to generate, execute, or otherwise implement a clearance table generation application 222 (or clearance table generator) that receives the transcribed textual clearance communications from the clearance transcription application 220 or receives clearance communications in textual form directly from a communications system 206 (e.g., a CPDLC system). The clearance table generator 222 parses or otherwise analyzes the textual representation of the received clearance communications and generates corresponding clearance communication entries in a table 224 in the memory 210. In this regard, the clearance table 224 maintains all of the clearance communications received by the transcription system 202 from either the onboard microphone 204 or an onboard communications system 206.

In exemplary embodiments, for each clearance communication received by the clearance table generator 222, the clearance table generator 222 parses or otherwise analyzes the textual content of the clearance communication using natural language processing and attempts to extract or otherwise identify, if present, one or more of an identifier contained within the clearance communication (e.g., a flight identifier, call sign, or the like), an operational subject of the clearance communication (e.g., a runway, a taxiway, a waypoint, a heading, an altitude, a flight level, or the like), an operational parameter value associated with the operational subject in the clearance communication (e.g., the runway identifier, taxiway identifier, waypoint identifier, heading angle, altitude value, or the like), and/or an action associated with the clearance communication (e.g., landing, takeoff, pushback, hold, or the like). The clearance table generator 222 also identifies the radio frequency or communications channel associated with the clearance communication and attempts to identify or otherwise determine the source of the clearance communication. The clearance table generator 222 then creates or otherwise generates an entry in the clearance table 224 that maintains an association between the textual content of the clearance communication and the identified fields associated with the clearance communication. Additionally, the clearance table generator 222 may analyze the new clearance communication entry relative to existing clearance communication entries in the clearance table 224 to identify or otherwise determine a conversational context to be assigned to the new clearance communication entry (e.g., whether a given communication corresponds to a request, a response, an acknowledgment, and/or the like).

Still referring to FIG. 2, in one or more embodiments, the processor, control module, or other hardware associated with the transcription system 202 executes computer-executable programming instructions that cause the transcription system 202 to generate, execute, or otherwise implement a transcription analysis application 230 (or transcription analyzer) capable of analyzing, parsing, or otherwise processing transcriptions of received audio communications along with their associated fields of data maintained in the clearance table 224 to detect or otherwise identify when a respective received audio communication includes one or more operational terms for emphasis based on the current operational context indicated by the onboard system(s) 208. In this regard, the transcription analyzer 230 may receive signals, data or other information indicative of the current flight phase of the aircraft, the current airspace or geographic region the aircraft is operating within, the current aircraft configuration, the current aircraft altitude, and/or the like from one or more onboard system(s) 208. After identifying the current operational context, the transcription analyzer 230 may analyze the text of a transcribed audio communication to identify any operational terms contained therein that pertain or are otherwise relevant to the current operational context. For example, the transcription analyzer 230 may perform semantic analysis to identify whether the intent or objective corresponds to the current operational context, and if so, perform syntactic analysis to identify the operational terms within the transcription relative to the current operational context. In this regard, some embodiments of the transcription analyzer 230 may identify values for operational subjects, operational parameters, or other operational terms within the transcription by utilizing reference phraseologies, verbiage, syntactical rules and/or other syntactical information that define or otherwise delineate the applicable phraseology standard(s) 226 for the aircraft, which may be set forth by the ICAO, the FAA, or another regulatory body or organization. For example, the phraseology standards 226 may be maintained as a syntactic semantic mapping in a set of templates and/or rules that are saved or otherwise stored as a configuration file associated with the transcription analysis application 230.

In one or more embodiments, after identifying the presence of operational terms within a transcription of a received audio communication that are relevant to the current operational context at the time of the received audio communication, the transcription analyzer 230 may automatically generate or otherwise create one or more emphasis tags or other metadata indicators to be associated with the entry for that transcription in the clearance table 224 that identifies or otherwise indicates the operational term(s) for emphasis within the transcribed text. In this regard, the transcription analyzer 230 may automatically update one or more fields or columns of the database entry for the respective transcription to include an emphasis metadata tag value that indicates the position of the terms to be emphasized within the transcribed text. For example, when the transcription analyzer 230 determines the third term within the transcribed text corresponds to an assigned value provided by the ATC for an operational parameter or operational subject that is relevant to the current phase of flight, the transcription analyzer 230 may automatically update a field or column of that transcription's associated database entry to include an emphasis metadata tag value that indicates the third term of the transcription should be emphasized.

Additionally, in some embodiments, the transcription analyzer 230 may automatically generate or otherwise assign one or more operational context metadata tags to the database entry that may be utilized to identify the operational context(s) during which the operational term(s) should be emphasized. For example, the transcription analyzer 230 may tag the database entry for a transcription of an audio communication with indication of the current operational context associated with the audio communication at the time of receipt of the audio communication. Thereafter, when a subsequent operational context for the aircraft no longer matches the operational context for which the operational term(s) were relevant, the emphasis metadata tags may be ignored or discarded to dynamically revert the emphasis of those operational term(s) during playback once they are no longer operationally relevant.

Figure 3:
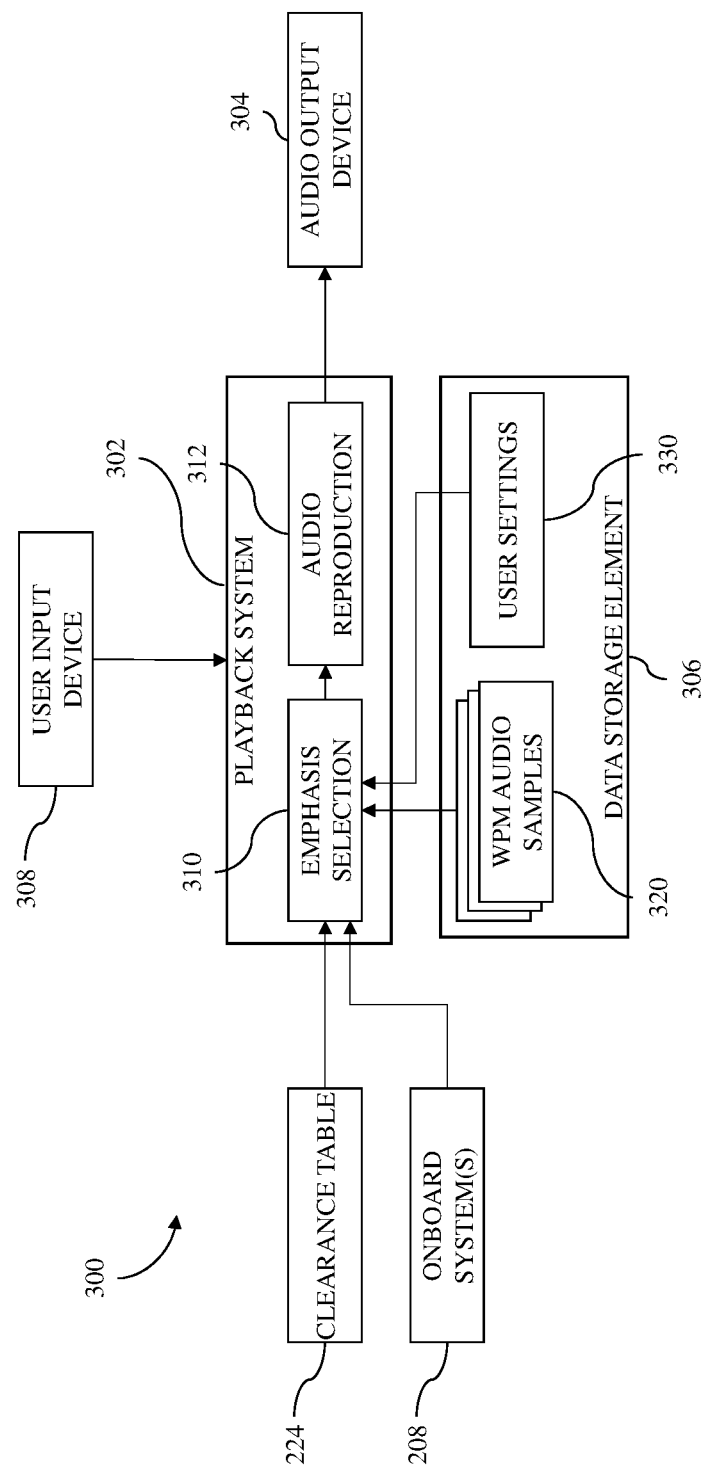
FIG. 3 is a block diagram illustrating a text-to-speech system suitable for use with the aircraft system of FIG. 1 in conjunction with the speech recognition system of FIG. 2 in accordance with one or more exemplary embodiments.

FIG. 3 depicts an exemplary embodiment of a text-to-speech system 300 for generating audio reproductions of transcribed audio communications or other text. In one or more exemplary embodiments, the text-to-speech system 300 is implemented or otherwise provided onboard a vehicle, such as aircraft 120, and utilized in connection with the speech recognition system 200 of FIG. 2 to generate audio reproductions of the transcriptions of received audio communications maintained in the clearance table 224. That said, similar to the speech recognition system 200, in alternative embodiments, the text-to-speech system 300 may be implemented independent of any aircraft or vehicle, for example, at a ground location such as an air traffic control facility, though for purposes of explanation, the text-to-speech system 300 may be primarily described herein in the context of an implementation onboard an aircraft.

The illustrated text-to-speech system 300 includes a playback system 302 that is coupled to an audio output device 304 (e.g., audio output device 105) and capable of generating audio reproductions via the audio output device 304 based on audio speech samples 320 maintained in a data storage element 306. In one or more embodiments, the playback system 302 is also coupled to one or more onboard systems 208 (e.g., one or more avionics systems 108, 110, 112, 114, 116) to receive signals or data indicative of the current operational context for selectively and dynamically varying emphasis of one or more operational terms within the audio reproduction of a transcription, as described in greater detail below. It should be understood that FIG. 3 is a simplified representation of the text-to-speech system 300 for purposes of explanation and ease of description, and FIG. 3 is not intended to limit the application or scope of the subject matter described herein in any way. In this regard, although the subject matter may be described herein in the context of generating speech or audio reproductions by selecting and concatenating segments of audio samples 320, it should be appreciated the subject matter may be implemented in an equivalent manner using any other suitable technique for speech synthesis.

The playback system 302 generally represents the processing system or component of the text-to-speech system 300 that is coupled to the audio output device 304 and the clearance table 224 to receive or otherwise obtain the transcription of an audio clearance communication selected for playback via a user input device 308 (e.g., user input device 104), analyze the emphasis metadata tags associated with the transcription with respect to the current operational context indicated by the onboard systems 208, and generate a corresponding audio reproduction or speech representative of the transcribed audio clearance communication with selective emphasis, as described in greater detail below. Depending on the embodiment, the playback system 302 may be implemented as a separate standalone hardware component, while in other embodiments, the features and/or functionality of the playback system 302 may be integrated with and/or implemented using another processing system (e.g., processing system 106, transcription system 202, etc.). In this regard, the playback system 302 may be implemented using any sort of hardware, firmware, circuitry and/or logic components or combination thereof. For example, depending on the embodiment, the playback system 302 may be realized as a general purpose processor, a content addressable memory, a digital signal processor, an application specific integrated circuit, a field programmable gate array, any suitable programmable logic device, discrete gate or transistor logic, processing core, a combination of computing devices (e.g., a plurality of processing cores, a combination of a digital signal processor and a microprocessor, a plurality of microprocessors, one or more microprocessors in conjunction with a digital signal processor core, or any other such configuration), discrete hardware components, or any combination thereof, designed to perform the functions described herein.

In exemplary embodiments, computer-executable programming instructions are executed by the processor, control module, or other hardware associated with the playback system 302 and cause the playback system 302 to generate, execute, or otherwise implement an emphasis selection application 310 capable of analyzing, parsing, or otherwise processing an entry in a clearance table 224 corresponding to a transcription selected for playback to identify operational terms within the transcription for emphasis based on current operational context data received from the onboard system(s) 208. In this regard, the emphasis selection application 310 compares the current operational context indicated by the onboard system(s) 208 to the emphasis metadata tags associated with the transcription to determine whether any terms of the transcription should be emphasized. In one or more embodiments, when the current operational context matches or otherwise corresponds to an emphasis metadata tag that indicates an operational term within the transcription should be emphasized, the emphasis selection application 310 selects or otherwise obtains an audio sample for the operational term that has a reduced WPM or slower playback rate relative to other terms within the transcription (e.g., non-operational terms or operational terms not relevant to the current operational context). For example, different libraries of audio samples 320 may be maintained for different playback rates or WPM values, with the emphasis selection application 310 dynamically and selectively varying from which library audio samples 320 for different terms are selected based on the emphasis metadata tags. As described in greater detail below, in exemplary embodiments, the data storage element 306 may also maintain user settings information 330 that indicate one or more preferred playback rates or WPM values for the particular user associated with the playback request, which, in turn, may be utilized by the emphasis selection application 310 to determine which library of audio samples 320 should be utilized in real-time, based on the current operational context, and on a term-by-term basis.

In exemplary embodiments, the computer-executable programming instructions executed by the playback system 302 also cause the playback system 302 to generate, execute, or otherwise implement an audio reproduction application 312 (or speech generator) that receives the audio samples selected or otherwise indicated by the emphasis selection application 310 and generates a corresponding audio reproduction of the transcription that is reconstituted from the audio samples. In this regard, the audio reproduction application 312 generates audio output signals that emulate human speech reciting the transcribed audio communication with a playback rate or WPM that corresponds to the user's playback preferences indicated by the user settings 330 with selective emphasis on relevant operational terms in a manner that dynamically reflects the current operational context. In some embodiments, the audio reproduction application 312 may be configurable to selectively vary the volume, amplitude, or other characteristic of the audio output signals to provide additional emphasis for particular terms or phrases in addition to varying the playback rate. The output signals generated by the audio reproduction application 312 are provided to the audio output device 304, which, in turn, generates corresponding aural or auditory output, the content of which corresponds to the transcription of a previously received audio communication selected for playback.

Figure 4:
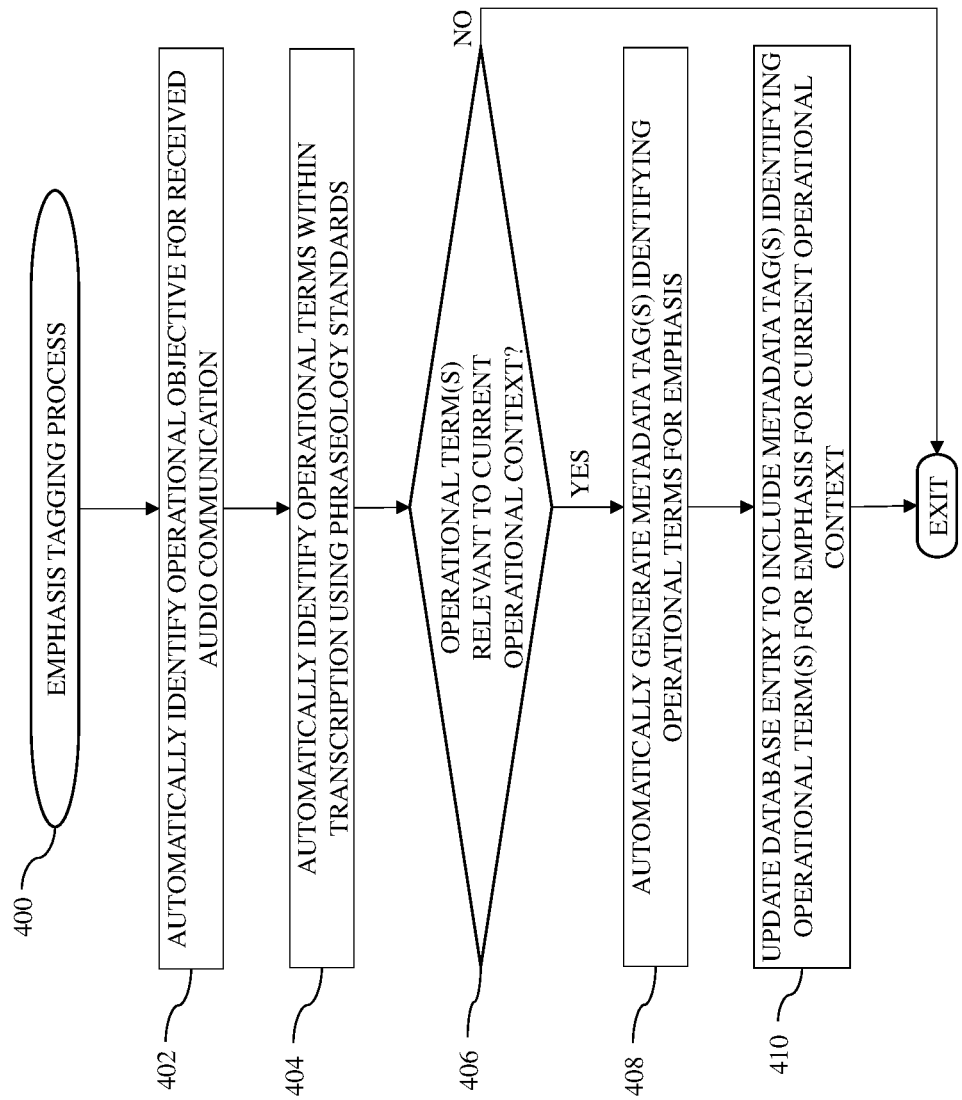
FIG. 4 is a flow diagram of an emphasis tagging process suitable for implementation by the speech recognition system of FIG. 2 in accordance with one or more embodiments.

FIG. 4 depicts an exemplary embodiment of an emphasis tagging process 400 suitable for implementation by an aircraft system to mark, tag or otherwise identify terms for playback emphasis within transcribed audio communications. The various tasks performed in connection with the illustrated process may be implemented using hardware, firmware, software executed by processing circuitry, or any combination thereof. For illustrative purposes, the following description may refer to elements mentioned above in connection with FIGS. 1-3. In practice, portions of the emphasis tagging process 400 may be performed by different elements of the aircraft system 100. That said, exemplary embodiments are described herein in the context of the emphasis tagging process 400 being primarily performed by the transcription analyzer 230 at the transcription system 202 and/or the processing system 106. It should be appreciated that the emphasis tagging process 400 may include any number of additional or alternative tasks, the tasks need not be performed in the illustrated order and/or the tasks may be performed concurrently, and/or the emphasis tagging process 400 may be incorporated into a more comprehensive procedure or process having additional functionality not described in detail herein. Moreover, one or more of the tasks shown and described in the context of FIG. 4 could be omitted from a practical embodiment of the emphasis tagging process 400 as long as the intended overall functionality remains intact.

Referring to FIG. 4 with continued reference to FIGS. 1-3, in exemplary embodiments, the emphasis tagging process 400 continually monitors and analyzes received audio communications to automatically identify an operational objective for each received audio communication (task 402). As described above, in exemplary embodiments, the audio content of clearance communications received at the aircraft are continually transcribed into corresponding textual representations (e.g., by the clearance transcription application 220), which, in turn, are then parsed and analyzed to identify the operational subjects and parameters specified within the received sequence of clearance communications pertaining to the aircraft (e.g., by the clearance table generator 222). For example, natural language processing may be applied to the textual representations of the clearance communications directed to the ownship aircraft by ATC, provided by the ownship aircraft to ATC, or received from ATIS to identify the operational subject(s) of the clearance communications and any operational parameter value(s) and/or aircraft action (s) associated with the clearance communications, which are then stored or otherwise maintained in association with the transcribed audio content of the received audio communication in the clearance table 224. For each entry in the clearance table 224, the transcription analyzer 230 utilizes natural language processing, machine learning or artificial intelligence (AI) techniques to perform semantic analysis (e.g., parts of speech tagging, position tagging, and/or the like) on the transcribed audio communication to identify the operational objective of the communication. In other words, the audio communication is classified into a particular operational objective that indicates what the communication is intended to convey with respect to operation of the aircraft based on the syntax of the operational subject(s), operational parameter(s) and/or action(s) contained within the communication. For example, an ATC clearance communication of "CLEARED RUNWAY 27L" corresponding to an instruction to takeoff from a particular runway may be classified or otherwise categorized into a takeoff operational objective.

In some embodiments, the transcription analyzer 230 may utilize the current conversational context and/or transcriptions of preceding audio communications maintained in the clearance table 224 to intelligently determine the most likely operational objective in the context of the preceding communications to/from the aircraft. For example, if a preceding audio communication includes a request by the pilot of the ownship aircraft having a particular operational objective, the transcription analyzer 230 may ascertain a subsequent audio clearance communication received from ATC as a response pertaining to that same operational objective. Additionally, some embodiments of the transcription analyzer 230 may utilize the current operational context of the aircraft at the time of receipt of the respective audio communication (e.g., the current flight phase, the current airspace or geographic region of operation, the current aircraft configuration, the current aircraft altitude, and/or the like) to identify the most likely or probable operational objective given the current operating context indicated by the onboard systems 208.

After determining the operational objective for the received audio communication, the emphasis tagging process 400 automatically identifies the operational terms within the transcription using the applicable phraseology standard(s) and determines whether the operational term(s) in the transcription pertain to the current operational context (tasks 404, 406). When the transcription includes operational term(s) that are relevant to the current operational context, the emphasis tagging process 400 automatically creates or otherwise generates one or more metadata tags identifying the operational terms for emphasis and automatically updates the clearance table database entry to include the emphasis metadata tag(s) in association with the transcription (tasks 408, 410).

In one or more embodiments, based on the identified operational objective, the transcription analyzer 230 utilizes phraseology standard information 226 to identify or otherwise determine the expected syntax for a clearance communication corresponding to the identified operational objective and the particular operational subject(s), operational parameter(s) and/or action(s) that are required or otherwise expected to be specified or declared within the clearance communication. For example, if the objective is takeoff instruction or command from ATC, the transcription analyzer 230 may determine the expected ATC clearance communication to include a runway identifier and the call sign for the intended recipient aircraft based on the standard phraseology (e.g., "CLEARED RUNWAY [RUNWAY IDENTIFIER] [AIRCRAFT TAIL NUMBER]"). Thus, for an ATC clearance communication of "CLEARED RUNWAY 27L," the transcription analyzer 230 may identify the term "27L" as the parameter value for the runway operational parameter. Thereafter, the transcription analyzer 230 determines whether the runway operational parameter value is relevant to the current operational context based on the relationship between the current operational context and the operational objective. For example, when the aircraft is in a taxiing or departure phase of flight and the operational objective of the ATC clearance communication is an instruction to takeoff from a particular runway, the transcription analyzer 230 may determine the assigned runway parameter value of "27L" is relevant to the current operational context.

In response to determining the term "27L" within the transcription pertains to the current operational context, the transcription analyzer 230 automatically creates or otherwise generates one or more emphasis metadata tags that indicate the third term of the transcription entry associated with the ATC clearance communication of "CLEARED RUNWAY 27L" should be emphasized when the current flight phase corresponds to a taxiing or departure flight phase. The transcription analyzer 230 updates the entry associated with the transcription of the "CLEARED RUNWAY 27L" communication in the clearance table 224 to include one or more fields or columns that indicate the third term of the transcription should be emphasized during a taxiing or departure flight phase. In this manner, the clearance table 224 stores or otherwise maintains emphasis metadata tags in association with individual transcriptions of clearance communications.

Figure 5:
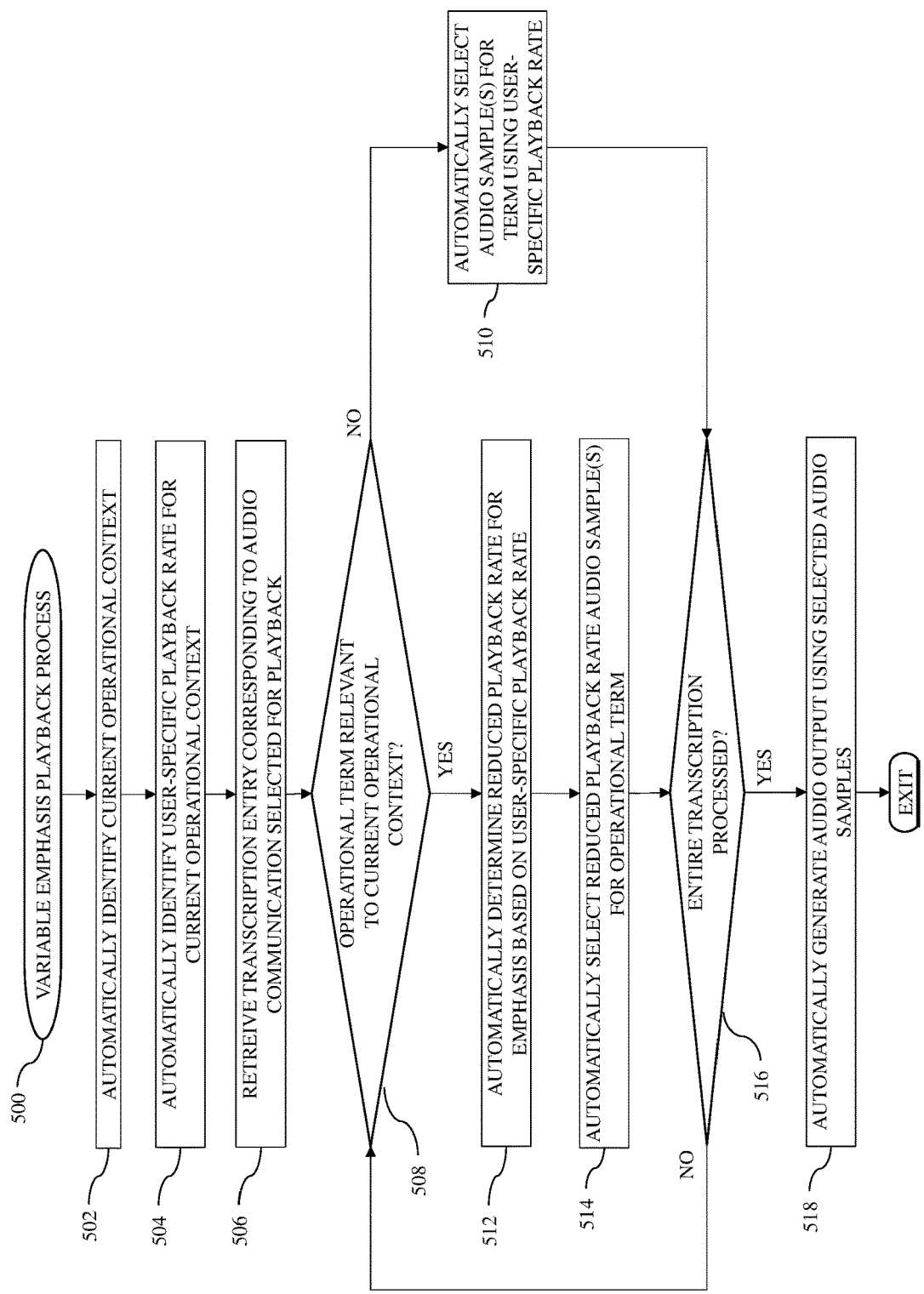
FIG. 5 is a flow diagram of a variable emphasis playback process suitable for implementation by the text-to-speech system of FIG. 3 in connection with the emphasis tagging process of FIG. 4 in accordance with one or more embodiments.

FIG. 5 depicts an exemplary embodiment of a variable emphasis playback process 500 suitable for implementation by an aircraft system in connection with the emphasis tagging process 400 of FIG. 4 to playback audio corresponding to transcribed audio communications with dynamically and/or selectively varying emphasis in accordance with user-specific playback settings or preferences. The various tasks performed in connection with the illustrated process may be implemented using hardware, firmware, software executed by processing circuitry, or any combination thereof. For illustrative purposes, the following description may refer to elements mentioned above in connection with FIGS. 1-3. In practice, portions of the variable emphasis playback process 500 may be performed by different elements of the aircraft system 100. That said, exemplary embodiments are described herein in the context of the variable emphasis playback process 500 being primarily performed by the text-to-speech system 300 and/or the playback system 302, which in some embodiments may be implemented by or at the processing system 106. It should be appreciated that the variable emphasis playback process 500 may include any number of additional or alternative tasks, the tasks need not be performed in the illustrated order and/or the tasks may be performed concurrently, and/or the variable emphasis playback process 500 may be incorporated into a more comprehensive procedure or process having additional functionality not described in detail herein. Moreover, one or more of the tasks shown and described in the context of FIG. 5 could be omitted from a practical embodiment of the variable emphasis playback process 500 as long as the intended overall functionality remains intact.

In exemplary embodiments, the variable emphasis playback process 500 is initiated or otherwise performed in response to a user selection of a transcription of a preceding audio communication for playback. In one or more embodiments, an ATC transcription player graphical user interface (GUI) display is displayed, rendered, or otherwise presented by on a display device 102 onboard an aircraft 120 (e.g., by one of the processing system 106, the speech recognition system 200 or the text-to-speech system 300) that includes a listing of the preceding audio communications for which corresponding transcription entries in the clearance table 224 exist. For example, a list box, a drop-down list or menu or another suitable GUI element may be presented that allows the user to select or otherwise indicate which preceding communication the user would like to be played back. In this regard, the user may select, highlight or otherwise indicate the desired communication within the listing of available communications for playback and then select or otherwise activate a play button or similar GUI element to initiate playback of the selected communication, thereby initiating the variable emphasis playback process 500.

The variable emphasis playback process 500 automatically identifies or otherwise determines the current operational context for the vehicle at the time of playback and the user-specific playback rate for the current operational context (tasks 502, 504). In this regard, the playback system 302 and/or the emphasis selection application 310 receives indicia of the current operational context from the onboard system(s) 208 and then queries the user settings information 330 in the data storage element 306 to identify the user's desired or specified WPM for the current operational context. For example, the ATC transcription player GUI display may include a slider or similar GUI element that allows the user to adjust the playback rate to be faster or slower, and thereby increase or decrease the WPM of the resulting audio generated by the text-to-speech system 300. Based on the position of the slider, the playback system 302 may update the user settings information 330 for the user to indicate the corresponding WPM value as the user's preferred WPM value for the current operational context. In this regard, machine learning, artificial intelligence or another suitable technique may be utilized to dynamically and adaptively determine the user's preferred WPM value for different operational contexts based on the manner in which the user historically adjusts (or does not adjust) the playback rate over time depending on the particular operational context, resulting in user settings information 330 that includes user-configured playback rates or WPM values associated with different operational contexts (e.g., different flight phases, geographic regions, and/or the like). For example, for each individual user, the user settings information 330 may be initialized with a default WPM value to be utilized across all operational contexts, with the user's manual adjustment or configuration of the slider or other GUI element to increase or decrease the WPM value being utilized to personalize the user settings information 330 to reflect user-configured WPM values for different operational contexts. That said, in some embodiments, the user's preferred WPM value may be identified or otherwise determined based on the current position of the playback rate slider independent of the user's historical playback behavior or settings.

Still referring to FIG. 5, the variable emphasis playback process 500 continues by retrieving or otherwise obtaining the transcription for the audio communication selected for playback, and then sequentially and incrementally analyzes each term of the transcription to detect or otherwise identify whether the current term of interest corresponds to an operational term that is relevant to the current operational context using the emphasis metadata tags (tasks 506, 508). For example, in response to receiving indication of the selected audio communication from the ATC transcription player GUI display via the user input device 308, the playback system 302 and/or the emphasis selection application 310 accesses the clearance table 224 to retrieve or otherwise obtain the entry from the clearance table 224 corresponding to the selected audio communication. Thereafter, the emphasis selection application 310 utilizes the emphasis metadata tags associated with the entry to incrementally progress through the transcription of the audio communication on a term-by-term basis to identify any operational terms relevant to the current operational context indicated by the onboard system(s) 208. For each term of the transcription of the selected audio communication that is not tagged for emphasis, the variable emphasis playback process 500 selects or otherwise obtains one or more audio samples for converting the text of the term into audio or speech at the user-specific playback rate (task 510). For example, when the emphasis selection application 310 encounters a term that is not an operational term or is otherwise not relevant to the current operational context, the playback system 302 and/or the emphasis selection application 310 selects or otherwise obtains one or more audio samples 320 for reconstructing audio or speech corresponding to the term that are associated with the user's preferred or previously-configured WPM value associated with the current operational context.

In the illustrated embodiment, when the emphasis metadata tags associated with the transcription entry indicated the current term of interest corresponds to an operational term that should be emphasized given the current operational context, the variable emphasis playback process 500 calculates or otherwise determines a reduced playback rate that should be utilized to emphasize the term based at least in part on the user-specific playback rate and then selects or otherwise obtains one or more audio samples for converting the text of the operational term into audio or speech at the reduced playback rate to selectively emphasize the operational term relative to surrounding terms of the transcription (tasks 512, 514). For example, when the emphasis selection application 310 encounters an operational term that is tagged for emphasis and the current operational context matches or otherwise corresponds to an operational context associated with the emphasis tag, the playback system 302 and/or the emphasis selection application 310 may calculate or otherwise determine a reduced WPM value for aurally emphasizing the term by multiplying or otherwise scaling the user-configured WPM value for the current operational context by a factor that achieves a desired reduction in playback rate (e.g., 0.75 to reduce the WPM value by 25%). The playback system 302 and/or the emphasis selection application 310 then selects or otherwise obtains one or more audio samples 320 for reconstructing audio or speech corresponding to the emphasized operational term that are associated with the reduced WPM value (e.g., 0.75 times the user-configured WPM value). That said, in other embodiments, the user may define or otherwise configure a user-specific value to be utilized to aurally emphasize operational terms, with the playback system 302 and/or the emphasis selection application 310 selecting or otherwise obtaining audio samples 320 that are associated with the user-configured emphasis WPM value, thereby varying the playback rate in a user-configurable manner.

Still referring to FIG. 5, the variable emphasis playback process 500 repeats the tasks 508, 510, 512 and 514 until determining that the entirety of the transcription has been processed for emphasis (task 516). Thereafter, the variable emphasis playback process 500 automatically generates an audio output corresponding to the transcription selected for playback using the selected audio samples associated with the user-configured playback rate (task 518). For example, in one or more embodiments, the audio reproduction application 312 may receive the selected audio samples 320 and corresponding WPM values (or indicia thereof) from the emphasis selection application 310 and then stage the audio samples 320 for playback at the corresponding WPM values before generating corresponding audio output signals to be provided to the audio output device 304. In this regard, the WPM of the resulting audio output may vary from the user-configured WPM value or playback rate for the current operational context to the reduced WPM value to selectively emphasize the operational term(s) relevant to the current operational context relative to the remainder of the audio communication.

In addition to selectively varying the WPM to aurally emphasize the relevant operational term(s), some embodiments of the audio reproduction application 312 may support selectively aurally emphasizing terms by increasing or otherwise modulating the volume of the audio output. For example, the emphasis selection application 310 may provide indicia of emphasis to be associated with a particular term to the audio reproduction application 312, which, in turn, may increase the amplitude of the audio output signals associated with the emphasized term (e.g., by multiplying the current volume level by a factor greater than one). In this regard, in some embodiments, similar to personalizing the playback rate in a user-specific or user-configurable manner, the subject matter may be implemented in an equivalent manner for the playback volume or other playback settings. For example, similar to the playback rate, the ATC transcription player GUI display may also include a slider or similar GUI element that allows the user to adjust the volume of the audio output to be louder or quieter, and thereby increase or decrease the volume of the resulting audio generated by the text-to-speech system 300. Based on the position of the volume slider, the playback system 302 may update the user settings information 330 for the user to indicate the corresponding volume level as the user's preferred volume for the current operational context. Thus, the audio reproduction application 312 may retrieve and utilize the user-configured volume level for the current operational context that is maintained in the user settings information 330 to generate an audio reproduction of the transcription for the selected audio communication in accordance with the user-configured playback rate and with the user-configured volume level, with the playback rate and/or the volume level selectively varying to emphasize any relevant operational terms within the transcription.

In addition to selectively varying the playback rate and volume, some embodiments of the text-to-speech system 300 may also be configured to duplicate or otherwise repeat relevant operational terms to aurally emphasize the terms using repetition. For example, the emphasis selection application 310 may provide indicia of emphasis to be associated with a particular term to the audio reproduction application 312, which, in turn, may be utilized by the audio reproduction application 312 to repeat the staging of the audio samples associated with that operational term so that the particular value of the operational term is repeated within the audio output. For example, for playback of the ATC clearance communication of "CLEARED RUNWAY 27L" when the aircraft is currently in the taxiing or departure phase, the emphasis selection application 310 may indicate the third term of the transcription should be emphasized, which, in turn, results in the audio reproduction application 312 to repeat the staging of the audio samples associated with the assigned runway value to produce an audio output corresponding to "CLEARED RUNWAY 27L 27L." In this regard, in addition to repeating the assigned runway value, it should be appreciated that the audio output for the assigned runway value of "27L" will also be generated with a reduced WPM value and/or an increased volume level to further emphasize the assigned runway value. For example, if the user-configured playback rate for the current operational context corresponds to a preferred WPM value of 100 words per minute for the current operational context, the audio output for the assigned runway value of "27L" may be generated at 75 words per minute to aurally emphasize the value of "27L" relative to the remainder of the ATC clearance communication, thereby improving comprehension of the assigned runway value. Similarly, the audio output for the assigned runway value of "27L" may be generated at a higher volume level relative to the user-configured volume level preference for the current operational context to further improve comprehension of the assigned runway value.

Figure 6:
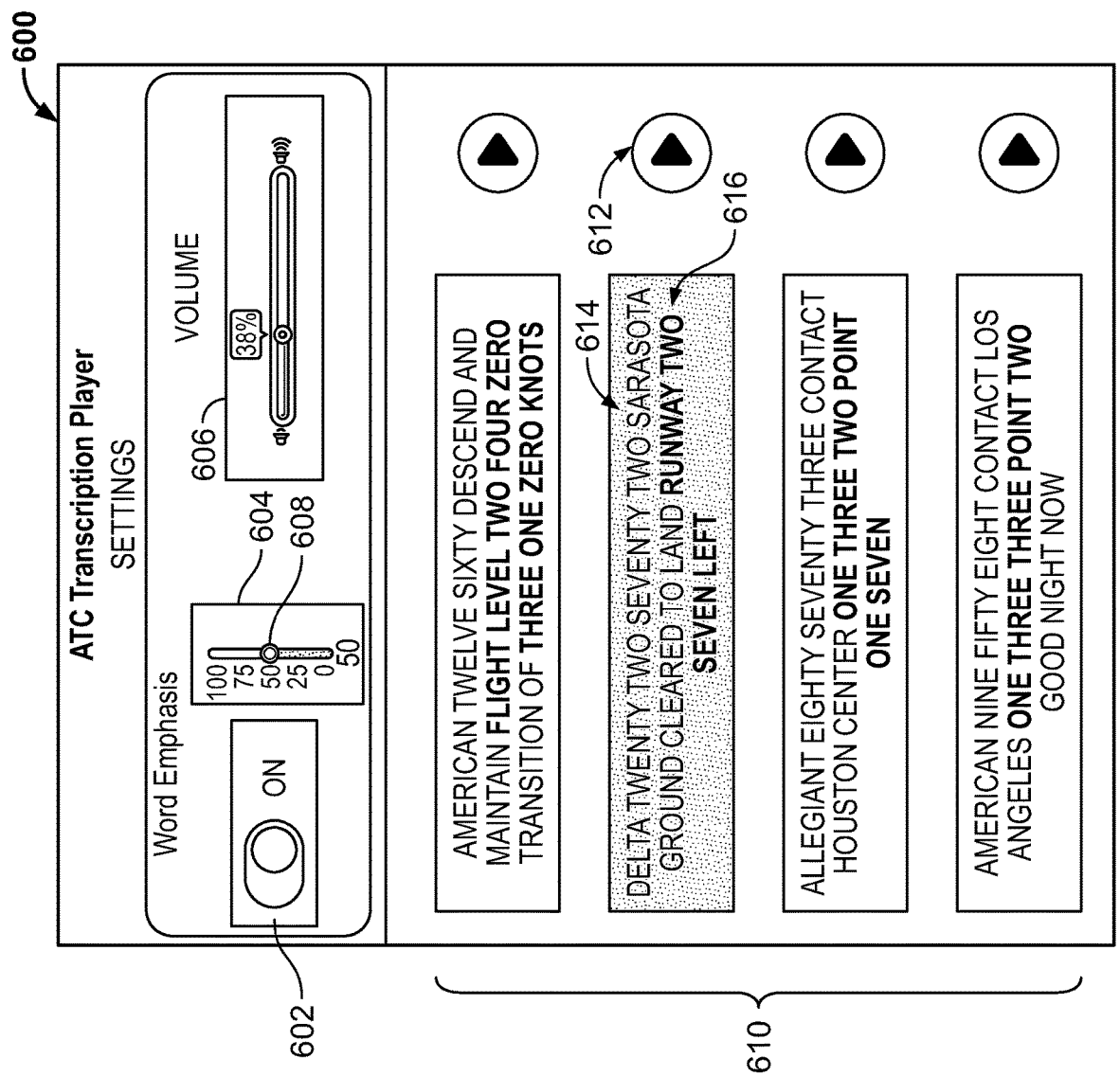
FIG. 6 is an exemplary graphical user interface (GUI) display suitable for presentation on a display device in the system of FIG. 1 in connection with the emphasis tagging process of FIG. 4 and the variable emphasis playback process of FIG. 5 in accordance with one or more exemplary embodiments.

FIG. 6 depicts an exemplary embodiment of an ATC transcription player GUI display 600 suitable for presentation on a display device 102 in connection with the emphasis tagging process 400 of FIG. 4. The ATC transcription player GUI display 600 includes a button 602 or similar selectable GUI element that is configurable or manipulable by a user to enable the variable emphasis playback process 500 of FIG. 5, a first slider 604 or similar GUI element that is configurable or manipulable by a user to adjust the playback rate, and a second slider 606 or similar GUI element that is configurable or manipulable by a user to adjust the playback volume. In this regard, the position of a slider bar 608 with respect to the slider path for the playback rate slider 604 corresponds to the user-configured playback rate to be utilized as a reference playback rate for the variable emphasis playback process 500 (e.g., task 504). In the absence of the pilot or other user adjusting the slider bar 608, by default the slider bar 608 may be positioned or otherwise rendered on the playback rate slider 604 in a manner that corresponds to the probable or likely preferred playback rate setting for the particular individual user and for the current operational context derived from the user's historical playback behavior using AI, machine learning and/or the like.

The ATC transcription player GUI display 600 also includes a menu or list 610 of transcribed ATC communications available for playback, where the graphical representation of each transcribed ATC communication depicted in the list 610 includes a playback button, icon, or similar GUI element associated therewith that is selectable by the user to initiate playback of the selected ATC transcription (e.g., task 506). In the illustrated embodiment, the operational terms tagged for emphasis are rendered using a different color, font type, font weight, font style and/or other visually distinguishable graphical characteristics to enable a pilot or other user to provide visual emphasis that allows the pilot to quickly and easily visually identify the operational terms of significance within the respective ATC communications. In response to selection of the playback button 612 associated with a particular transcribed ATC clearance communication, the graphical representation 614 of the selected ATC clearance communication transcription may be rendered using one or more visually distinguishable graphical characteristics (e.g., shading, bolding, fill pattern and/or the like) to highlight or otherwise visually differentiate the selected ATC clearance communication transcription 614 from the other displayed ATC clearance communication transcriptions within the list 610.

As described above, in response to receiving indication of the selected ATC clearance communication transcription 614 from the ATC transcription player GUI display 600, the playback system 302 and/or the emphasis selection application 310 retrieves or otherwise obtains the entry corresponding to the selected ATC clearance communication from the clearance table 224 and utilizes the emphasis metadata tags associated with the entry to incrementally analyze the transcription of the audio communication for the selected ATC clearance communication on a term-by-term basis. For terms of the transcription of the selected ATC clearance communication transcription 614 that are not tagged for emphasis (e.g., "DELTA TWENTY TWO SEVENTY TWO SARASOTA GROUND CLEARED TO LAND"), the emphasis selection application 310 obtains one or more audio samples 320 for reconstructing audio or speech corresponding to the terms using the user-specific WPM value (e.g., 50 words per minute) indicated by the position of the slider bar 608 with respect to the playback rate slider 604.

When the playback system 302 and/or the emphasis selection application 310 encounters the operational terms 616 tagged for emphasis (e.g., "RUNWAY TWO SEVEN LEFT"), the playback system 302 and/or the emphasis selection application 310 may calculate or otherwise determine a reduced WPM value for aurally emphasizing the operational terms 616 by multiplying or otherwise scaling the user-configured WPM value indicated by the playback rate slider 604 for the current operational context by a factor that achieves a desired reduction in playback rate (e.g., 50×0.75=37.5 words per minute). The playback system 302 and/or the emphasis selection application 310 then selects or otherwise obtains one or more audio samples 320 for reconstructing audio or speech corresponding to the emphasized operational terms 616 that are associated with the reduced WPM value. Thereafter, the audio reproduction application 312 receives the selected audio samples 320 and corresponding WPM values (or indicia thereof) from the emphasis selection application 310 and then stages the audio samples 320 for playback of the selected ATC clearance communication transcription 614 at the corresponding WPM values before generating corresponding audio output signals to be provided to the audio output device 304. As a result, the resulting reproduced audio output for the selected ATC clearance communication transcription 614 may vary from the user-configured WPM value or playback rate of 50 words per minute indicated by the slider bar 608 to selectively emphasize the operational terms 616 tagged for emphasis using a reduced playback rate of 37.5 words per minute. Additionally, in some embodiments, the audio reproduction application 312 dynamically vary the volume of the audio output for the emphasized operational terms 616 relative to the user-configured volume level indicated by the volume slider 606 to increase the volume of the audio output for the emphasized operational terms 616 while the audio output for the remaining terms of the ATC clearance communication transcription 614 selected for playback are generated using the user-configured volume level indicated by the volume slider 606.

By selectively and dynamically varying the aural emphasis associated with operational terms that are relevant to the current aircraft operation during playback of a transcribed audio communication, the listening comprehension of those operational terms of significance may be improved, thereby improving the safety and efficiency of aircraft operation. For example, to the extent the selection of a particular audio communication for playback inherently indicates that the pilot or other user failed to comprehend the entirety of the audio communication, the transcribed audio communication is converted to speech or otherwise reproduced as audio that use a playback rate that has been previously-configured by the pilot or otherwise indicated by the pilot as preferable for the given operational context, thereby increasing the likelihood that the pilot will comprehend the audio reproduction. In addition to that, the portions of the audio corresponding to the operational terms relevant to the current operational context of the aircraft are played back at a reduced playback rate that provides an aural cue, thereby allowing the pilot to aurally differentiate the operational terms from the remainder of the ATC clearance communication audio, thereby increasing the likelihood that the pilot will recognize and comprehend those operational terms. Similarly, the audio reproduction of the transcribed audio communication may be generated using a volume level that has been previously-configured by the pilot or otherwise indicated by the pilot as preferable for the given operational context, with the portions of the audio corresponding to the operational terms relevant to the current operational context of the aircraft selectively increasing in volume relative to the remainder of the audio, thereby allowing the pilot to further aurally differentiate the operational terms from the remainder of the ATC clearance communication audio. Moreover, by dynamically adapting the emphasis to reflect the current operational context, the variable playback rate emphasis only occurs when temporally and operationally relevant to avoid aurally emphasizing operational terms that may no longer be relevant or otherwise attenuating the impact of selectively varying the playback rate, volume or other emphasis (e.g., redundancy).

For the sake of brevity, conventional techniques related to user interfaces, speech recognition, text-to-speech, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of assisting operation of a vehicle, the method comprising:
   automatically determining a current operational context of the vehicle;
   analyzing a transcription of an audio communication with respect to the vehicle to identify an operational term pertaining to the current operational context of the vehicle within the transcription;
   creating an indicator identifying the operational term within the transcription for emphasis when the operational term pertains to the current operational context of the vehicle;
   identifying a user-configured playback rate;
   selecting a first subset of one or more audio samples for reconstructing audio for the operational term having a reduced playback rate;
   selecting a second subset of one or more audio samples for reconstructing audio for a remainder of the transcription having the user-configured playback rate; and
   generating an audio reproduction of the transcription of the audio communication using the first subset of one or more audio samples having the reduced playback rate and the second subset of one or more audio samples having the user-configured playback rate, wherein the operational term is selectively emphasized within the audio reproduction based on the indicator by selectively varying the user-configured playback rate.

2. The method of claim 1, further comprising:
   calculating the reduced playback rate using the user-configured playback rate.

3. The method of claim 1, wherein generating the audio reproduction comprises selectively increasing a volume level associated with a portion of the audio reproduction corresponding to the operational term.

4. The method of claim 1, wherein generating the audio reproduction comprises selectively decreasing a words per minute associated with a portion of the audio reproduction corresponding to the operational term.

5. The method of claim 1, further comprising obtaining an updated operational context for the vehicle, wherein generating the audio reproduction comprises dynamically varying the emphasis associated with a portion of the audio reproduction comprising the operational term based on a relationship between the updated operational context and the current operational context at a time associated with receipt of the audio communication.

6. The method of claim 1, further comprising identifying the user-configured playback rate based on a position of a graphical user interface element associated with a playback rate for the audio reproduction, wherein the operational term is selectively emphasized within the audio reproduction by reducing the playback rate for a portion of the audio reproduction comprising the operational term relative to the user-configured playback rate.

7. The method of claim 1, further comprising identifying the user-configured playback rate based on historical playback behavior associated with a user.

8. The method of claim 1, wherein creating the indicator comprises creating one or more metadata tags associated with an entry for the transcription in a data storage element, wherein the one or more metadata tags indicate at least one of a position of the operational term within the transcription and the current operational context.

9. The method of claim 1, wherein:
generating the audio reproduction comprises converting text of the transcription of the audio communication into speech audio output;
the operational term is selectively emphasized within the speech audio output by reducing a words per minute associated with a first portion of the speech audio output comprising the operational term;
a second words per minute associated with a second portion of the speech audio output comprising a term of the transcription preceding or following the first portion of the speech audio output comprising the operational term corresponds to the user-configured playback rate;
the second words per minute is greater than the words per minute associated with the first portion of the speech audio output comprising the operational term; and
the term of the transcription precedes or follows the operational term within the transcription.

10. The method of claim 9, wherein generating the audio reproduction comprises selectively increasing a volume level associated with the first portion of the speech audio output comprising the operational term relative to a second volume level associated with the second portion of the speech audio output.

11. The method of claim 1, wherein generating the audio reproduction comprises deemphasizing the operational term within the audio reproduction based on the indicator by generating a portion of the audio reproduction comprising the operational term with the user-configured playback rate when an updated operational context for the vehicle does not match the current operational context at a time associated with the audio communication.

12. A non-transitory computer-readable medium having computer-executable instructions stored thereon that, when executed by a processing system, cause the processing system to:
automatically determine a current operational context of a vehicle;
analyze a transcription of an audio communication to identify an operational term pertaining to the current operational context of the vehicle within the transcription;
create an indicator identifying the operational term within the transcription for emphasis when the operational term pertains to the current operational context of the vehicle;
identify a user-configured playback rate;
select a first subset of one or more audio samples for reconstructing audio for the operational term having a reduced playback rate;
selecting a second subset of one or more audio samples for reconstructing audio for a remainder of the transcription having the user-configured playback rate; and
generate an audio reproduction of the transcription of the audio communication using the first subset of one or more audio samples having the reduced playback rate and the second subset of one or more audio samples having the user-configured playback rate, wherein the operational term is selectively emphasized within the audio reproduction based on the indicator by selectively varying the user-configured playback rate.

13. The computer-readable medium of claim 12, wherein the computer-executable instructions cause the processing system to selectively increase a volume level associated with a portion of the audio reproduction including the operational term.

14. The computer-readable medium of claim 12, wherein the computer-executable instructions cause the processing system to generate the audio reproduction of the transcription of the audio communication in accordance with the user-configured playback rate by converting the transcription of the audio communication into speech having a first words per minute corresponding to the user-configured playback rate, wherein the operational term is selectively emphasized by converting the operational term into speech using a second words per minute that is less than the first words per minute.

15. The computer-readable medium of claim 12, wherein the indicator comprises one or more metadata tags associated with an entry for the transcription in a data storage element, wherein the one or more metadata tags indicate at least one of a position of the operational term within the transcription and the current operational context at a time associated with the audio communication.

16. The computer-readable medium of claim 12, wherein the computer-executable instructions cause the processing system to deemphasize the operational term within the audio reproduction when an updated operational context for the vehicle does not match the current operational context at a time associated with the audio communication.

17. A system comprising:
a data storage element to maintain a transcription of an audio communication;
a user interface to receive indication of a user-configured playback rate; and
a processing system coupled to the user interface and the data storage element to:
receive indicia of a current operational context of a vehicle from one or more systems onboard the vehicle;
analyze the transcription of the audio communication to identify, within the transcription, an operational term pertaining to the current operational context;
create an indicator identifying the operational term within the transcription for emphasis when the operational term pertains to the current operational context of the vehicle;
select a first subset of one or more audio samples for reconstructing audio for the operational term having a reduced playback rate;
selecting a second subset of one or more audio samples for reconstructing audio for a remainder of the transcription having the user-configured playback rate; and
in response to selection of the transcription for playback, generate an audio output corresponding to the transcription of the audio communication using the first subset of one or more audio samples having the reduced playback rate and the second subset of one or more audio samples having the user-configured playback rate, wherein the operational term is selectively emphasized within the audio output based on the indicator by selectively varying the user-configured playback rate.

18. The method of claim 1, further comprising dynamically adjusting the user-configured playback rate based on the current operational context.

19. The method of claim 1, wherein analyzing the transcription of the audio communication with respect to the vehicle to identify the operational term comprises:
   determining an operational objective for the audio communication;
   determining an expected syntax for the audio communication based on the operational objective, the expected syntax including at least one of an operational subject, an operational parameter and an action; and
   identifying a value for the at least one of the operational subject, the operational parameter and the action within the transcription of the audio communication as the operational term.

* * * * *